Oct. 20, 1953     H. L. MUELLER     2,656,202

BICYCLE HANDLE BAR FORK

Filed Feb. 10, 1949

INVENTOR.
HOMER L. MUELLER
BY
Oberlin & Limbach
ATTORNEYS.

Patented Oct. 20, 1953

2,656,202

UNITED STATES PATENT OFFICE 2,656,202

BICYCLE HANDLE BAR FORK

Homer L. Mueller, Cleveland, Ohio, assignor to The Cleveland Welding Company, Cleveland, Ohio, a corporation of Ohio Application February 10, 1949, Serial No. 75,573

11 Claims. (Cl. 287—58)

1

The present invention relates as indicated to improvements in handlebar steering posts and more particularly to improved handle bar units for cycles.

The term "cycle" as used herein, is intended to include bicycles, tricycles, motorcycles and other similar vehicles.

The usual handlebar structure for cycles most commonly used today consists of a gooseneck handlebar steering post or stem rotatably mounted along with the stud portion of the cycle front wheel fork, within the frame steering head by means of an elongated threaded connecting bolt and a wedge member, effecting a tight frictional engagement between the cycle front wheel fork and the gooseneck handlebar steering stem. The handlebars proper are separate units and are adjustably retained in the gooseneck extension post or stem by means of the conventional friction clamp.

Due to the fact that the conventional handlebar construction for cycles is readily adjustable to suit the varied tastes of the individual cyclists, the interests of safety consequently have suffered considerably.

The principal object of this invention is to provide a handlebar steering structure for cycles which is generally more satisfactory than any heretofore previously employed.

Another object of this invention is to provide a fool-proof and tamper-proof structure for handlebar units which is nevertheless simple of construction and safe of operation.

Other objects will appear as the following description proceeds.

To the accomplishment of the foregoing and related ends, the invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Broadly stated, this invention consists in telescopically interfitting the stud portion of a cycle wheel-supporting fork and the stem portion of the cycle handle bar unit and in providing another member which is disposed within both of said stud and stem portions and which is axially shifted relative to one of said portions through a lateral projection thereon extending through the wall of the inner one of said stud and stem portions for effecting a frictional gripping of the inner one of said portions between the outer one of said portions and said another member. In this way, the stud and stem portions may be locked in desired positions without the usual polygonal bolt head or nut at the upper end of the stem portion or lower end of the stud portion.

More specifically stated, the present invention has to do with a connection of tubular members as aforesaid in which the lateral projection is in the form of a pin on said another member extending through an axially extending slot in the inner one of the stud and stem portions and in which a tubular nut means has threaded engagement around said inner portion and engages said pin to cause relative axial movement of said another member and said inner portion upon rotation of said nut.

Figure 2:
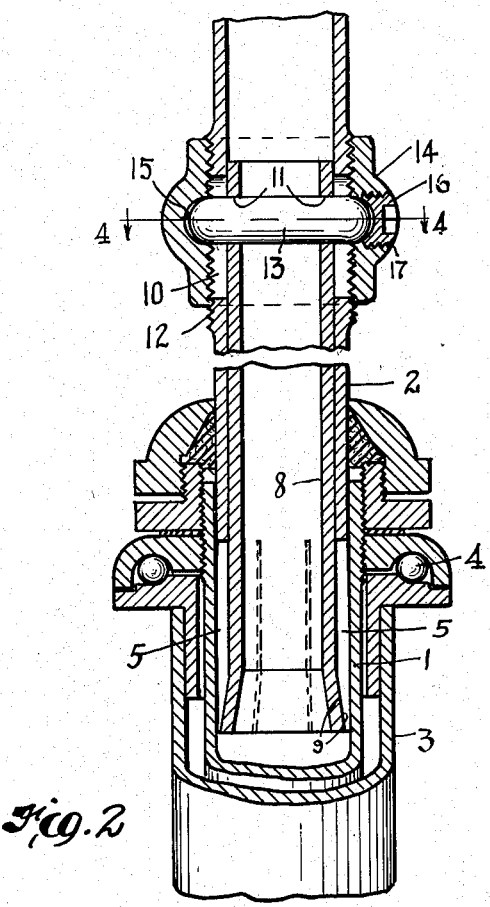
Fig. 2 is a vertical sectional view of a steering column assembly constructed in accordance with the principles of my invention.
Figure 3:
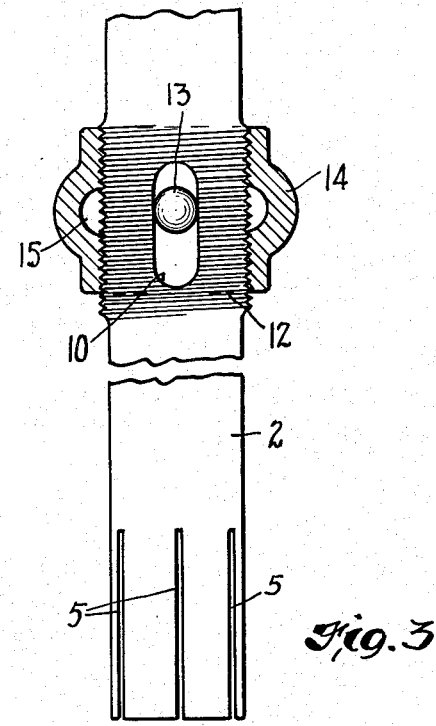
Fig. 3 is a side elevational view of one element of the steering assembly illustrated in the previous figure.
Figure 4:
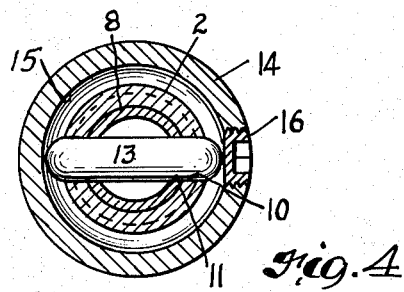
Fig. 4 is a transverse sectional view of the steering assembly taken substantially along a plane as indicated by the line 4—4 of Fig. 2.
Figure 1:
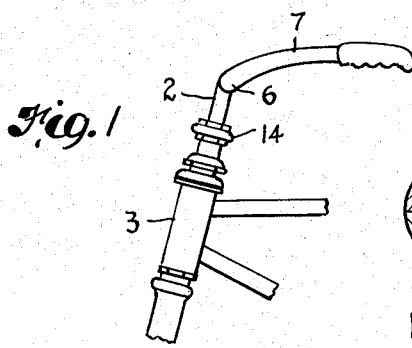
Fig. 1 is a partial side elevational view of a cycle using my improved handlebar steering assembly.

The illustrative embodiment of the invention shown in Fig. 2 comprises generally a fork member 1 and a handlebar stem member 2 arranged in telescopic engagement and rotatably supported in a frame head member generally indicated at 3 by means of anti-friction bearings 4. Handlebar stem 2 is a hollow metal element terminally slotted as indicated at 5 to facilitate the expansion of such lower end. The upper portion 6 of handlebar stem 2 is formed to engage and retain the handlebars 7 as shown in Fig. 1. Cylindrical expander element 8 is also a hollow metal tube adapted to fit within handlebar stem 2 in telescopic engagement therewith. There are complementary inclined seats 9 on the lower portions of both cylindrical expander 8 and handlebar stem 2 so that upon relative axial movement between the two elements, the slotted portion of handlebar stem 2 is expanded and forced into gripping engagement with the inner wall of front wheel fork stem 1.

Handlebar stem 2 is provided with diametrically opposite, axially extending slots 10 at a point removed from the slotted terminal portion 5. The cylindrical expander member 8 is likewise provided with a transverse opening 11 at its upper portion, which is in alignment with the axially extending slots 10 of handlebar stem 2. Handlebar stem 2 is further provided with threading 12 on its exterior surface in the area of the slots 10. Pin 13 is formed to extend through slots 10 of handlebar stem 2 and opening 11 of cylindrical expander element 8. The purpose of pin 13 is to control the relative axial movement of cylindrical expander 8 within handlebar stem 2.

Adjusting nut 14 is adapted to thread onto portion 12 of handlebar stem 2 and has an annular groove 15 on its inner face into which project the ends of pin 13 as best illustrated in Fig. 2. The axial distance between pin 13 and terminally slotted portion 5 of handlebar stem 2 may be varied depending on such circumstances as the size and type of the cycle frame, so as to provide sufficient space for the axial travel of adjusting nut 14. Screw plug 16 fits into threaded opening 17 of adjusting nut 14 and serves to retain pin 13 in position. Handlebars 7 may be connected to the upper portion 6 of handlebar stem 2 in any conventional manner. However, for purposes of this invention, best results were obtained when handlebars 7 were welded into an integral unit with handlebar stem 2. The contours of handlebar stem 2 have been illustrated as being merely of straight tubular construction; however, it is to be noted that any design that is practical may be employed with equal results, as for example, the usual gooseneck design.

In the practical operation of my invention, front wheel fork member 1 is inserted up into the steering head 3 of the cycle frame. The ball bearing journalling generally indicated at 4 is of conventional design and well known to those skilled in the art, so that further mention is not necessary. Handlebar stem 2 is prepared for use by inserting into said stem the cylindrical expander 8, and aligning apertures 10 and opening 11. Pin 13 is then inserted into such aligned openings after adjusting nut 14 has been moved down the threaded area 12 and opening 17 of nut 14 is also in alignment with apertures 10 and opening 11.

The assembled handlebar stem 2 is then inserted into terminal telescopic engagement with the front wheel fork stem 1, which is rotatably mounted within the frame steering post 3, and the height of the handlebar steering unit above the frame of the cycle is varied by adjusting the extent to which handlebar stem 2 is inserted into front wheel fork stem 1. With the ends of pin 13 resting in the annular groove 15 of nut 14, movement of nut 14 away from ball bearings 4 automatically brings cylindrical expander 8 up into element 2. The complementary inclined seats 9 of expander 8 force outwardly the lower portions of handlebar stem 2. The position of adjusting nut 14 determines the extent of the frictional engagement between fork stem 1 and handlebar stem 2 within steering head 3. Screw plug 16 is then inserted into opening 17 and the steering assembly is ready for use.

It might be mentioned at this point that the handlebars proper, generally indicated at 7, are welded to the upper portion of handlebar stem 2, thus eliminating the adjustment of the angle of the handlebars, which is more in keeping with the standards of safety. However, any known method of attachment may be employed and still be within the contemplation of this invention.

To disassemble the steering unit comprising my invention, it is only necessary to lower adjusting nut 14 toward the journalling 4 thereby breaking the frictional engagement between the cylindrical expander 8 and the handlebar stem 2 within the steering head 3. After screw plug 16 and pin 13 are removed from adjusting nut 14, the elements may be completely disassembled.

Figure 5:
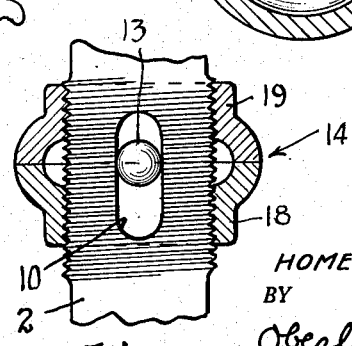
Fig. 5 is an illustration of one alternative form of construction of my invention.

The modification shown in Fig. 5 comprises manufacturing adjusting nut 14 in two portions 18 and 19 with the remainder of the invention remaining unchanged. Using this construction, assembly and disassembly is more easily effected by simply threading portion 18 of adjusting nut 14 on handlebar stem 2 to a point just below the aligned apertures 10 and opening 11. Pin 13 is then inserted through the spaces provided and portion 18 of the nut 14 is threaded up to engage pin 13 and progressively raised until the desired degree of frictional engagement is secured between handlebar stem 2 and front wheel fork stem 1. Portion 19 of the adjusting nut 14 is then lowered into close engagement with portion 18, and together act as a lock nut. In this manner, the need for screw plug 16 of nut 14 has been eliminated.

Other modes of applying the principle of the invention may be employed, change being made as regards the details described, provided the features stated in any of the following claims or the equivalent of such be employed.

I therefore particularly point out and distinctly claim as my invention:

1. The combination of inner and outer tubular members arranged in terminal telescopic engagement, said inner member being terminally slotted, a cylindrical expander member within said inner member, complementary inclined seats on said inner and expander members whereby upon relative axial movement thereof such slotted terminal portion may be expanded into gripping engagement with the inner wall of said outer member, means extending laterally from said expander member through the wall of said inner member, and a nut threaded on said inner member and engaged with said last named means for effecting such relative axial movement.

2. The combination of inner and outer tubular members arranged in terminal telescopic engagement, said inner member being terminally slotted, a cylindrical expander member within said inner member, complementary inclined seats on said inner and expander members whereby upon relative axial movement thereof such slotted terminal portion may be expanded into gripping engagement with the inner wall of said outer member, a pin extending transversely of said inner and expander members and engaged with said expander member, and means for moving said pin and thus said expander member relatively axially of said inner member.

3. The combination of inner and outer tubular members arranged in terminal telescopic engagement, said inner member being terminally slotted and formed with a slot in the wall thereof, a cylindrical expander member within said inner member, complementary inclined seats on said inner and expander members whereby upon relative axial movement thereof such slotted terminal portion may be expanded into gripping engagement with the inner wall of said outer member, a pin in close fitting engagement with said expander member and extending outwardly through such slot in the wall of said inner member, and means for securing said pin and expander member in selected positions axially of said inner member.

4. The combination of inner and outer tubular members arranged in terminal telescopic engagement, said inner member being terminally slotted and formed with an axially extending slot in the wall thereof, a cylindrical expander member within said inner member, complementary inclined seats on said inner and expander members whereby upon relative axial movement thereof such slotted terminal portion may be expanded into gripping engagement with the inner wall of said outer member, a pin in close fitting engagement with said expander member and extending outwardly through such axially extending slot in the wall of said inner member, and means for moving said pin and thus said expander member relatively axially of said inner member and for securing the same in a selected position.

5. The combination of inner and outer tubular members arranged in terminal telescopic engagement, said inner member being terminally slotted and formed with an axial slot in the wall thereof, a cylindrical expander member within said inner member, complementary inclined seats on said inner and expander members whereby upon relative axial movement thereof such slotted terminal portion may be expanded into gripping engagement with the inner wall of said outer member, a pin in close fitting engagement with said expander member and extending outwardly of said inner member through such axial slot in the wall of said inner member, and a nut means in screw threaded engagement with the outer surface of said inner member and engaging said pin to move the same and thus said expander member axially relative to said inner member.

6. The combination of inner and outer tubular members arranged in terminal telescopic engagement, said inner member being terminally slotted and formed with an axially extending slot in the wall thereof, a cylindrical expander member within said inner member, complementary inclined seats on said inner and expander members whereby upon relative axial movement thereof such slotted terminal portion may be expanded into gripping engagement with the inner wall of said outer member, a pin in close fitting engagement with said expander member and extending outwardly of said inner member through such axially extending slot in the wall of said inner member, and a nut means screw threaded on the outer surface of said inner member and embracing said pin on opposite sides thereof axially of said inner member.

7. The combination of inner and outer tubular members arranged in terminal telescopic engagement, said inner member being terminally slotted and formed with an axially extending slot in the wall thereof, a cylindrical expander member within said inner member, complementary inclined seats on said inner and expander members whereby upon relative axial movement thereof such slotted terminal portion may be expanded into gripping engagement with the inner wall of said outer member, a pin in close fitting engagement with said expander member and extending outwardly of said inner member through such axially extending slot in the wall of said inner member, and nuts threaded onto the outer surface of said inner member on opposite sides of said pin and in engagement therewith.

8. The combination of inner and outer tubular members arranged in terminal telescopic engagement, said inner member being terminally slotted, a cylindrical expander member within said inner member, complementary inclined seats on said inner and expander members whereby upon relative axial movement thereof such slotted terminal portion may be expanded into gripping engagement with the inner wall of said outer member, said inner member at a point remote from its slotted end, being provided with diametrically opposite, axially extending slots and said expander member being provided with a transverse opening in alignment with said slots, a pin extending through said slots and opening, threads on the exterior surface of said inner member in the area of said slots, and a nut on said threads, said nut having an annular groove on its inner face into which project the ends of said pin.

9. The combination of inner and outer tubular members arranged in terminal telescopic engagement, said inner member being terminally slotted, a cylindrical expander member within said inner member, complementary inclined seats on said inner and expander members whereby upon relative axial movement thereof such slotted terminal portion may be expanded into gripping engagement with the inner wall of said outer member, said inner member at a point remote from its slotted end, provided with diametrically opposite, axially extending slots and said expander member provided with a transverse opening in alignment with said slots, a pin extending through said slots and opening, threads on the exterior surface of said inner member in the area of said slots, and a nut means on said threads, said nut means providing an annular groove on the inner face into which project the ends of said pin.

10. The combination of inner and outer tubular members arranged in terminal telescopic engagement, said inner member being terminally slotted and formed with an axial slot through the wall thereof, a cylindrical expander member within said inner member, complementary inclined seats on said inner and expander members whereby upon relative axial movement thereof such slotted terminal portion may be expanded into gripping engagement with the inner wall of said outer member, a pin in close fitting engagement with said expander member extending outwardly of said inner member through such axial slot in the wall of the latter, and nuts in screw threaded engagement with the outer surface of said inner member disposed on opposite sides of said pin and adapted to engage said pin to move the same together with said expander member axially relative to said inner member.

11. The combination of an outer tubular member, a terminally slotted inner tubular member within said outer member, and another member within said inner member, said inner and another members being formed with complementary inclined seats whereby upon relative axial movement thereof the terminally slotted portion of said inner member will be frictionally gripped between said outer and another members, said inner member being formed with an axially extending slot in the wall thereof and a laterally projecting member on said another member extending through such axially extending slot in the wall of said inner member for effecting relative axial movement as aforesaid.

HOMER L. MUELLER.

References Cited in the file of this patent
UNITED STATES PATENTS

| Number | Name | Date |
|---|---|---|
| 579,265 | Gulick | Mar. 23, 1897 |
| 622,766 | Harris | Apr. 11, 1899 |
| 2,279,324 | Julien | Apr. 14, 1942 |